Figure 1:
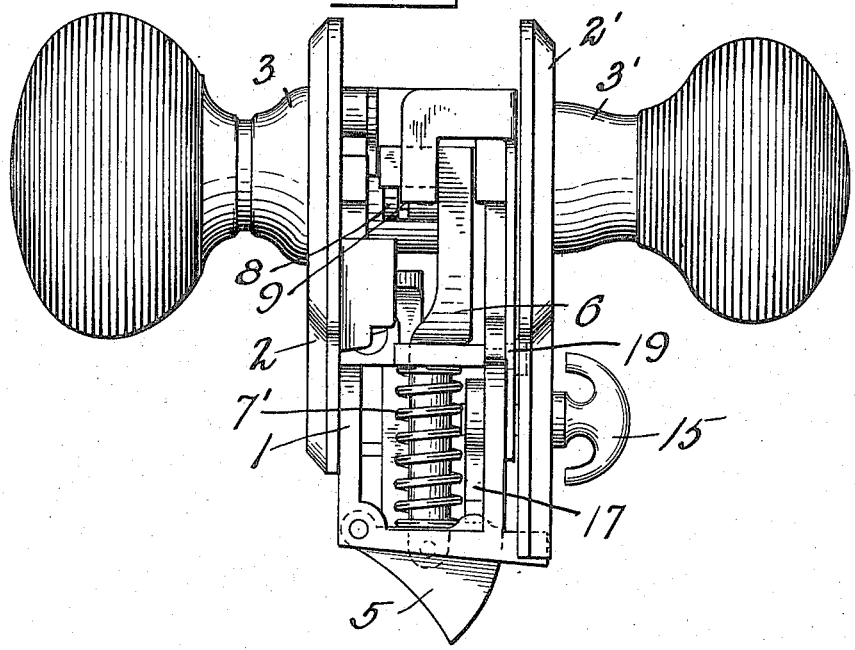

E. L. TEICH.
LOCK.
APPLICATION FILED MAY 2, 1916.

1,190,686.

Patented July 11, 1916.
4 SHEETS—SHEET 1.

Inventor
E. L. TEICH
By his Attorneys

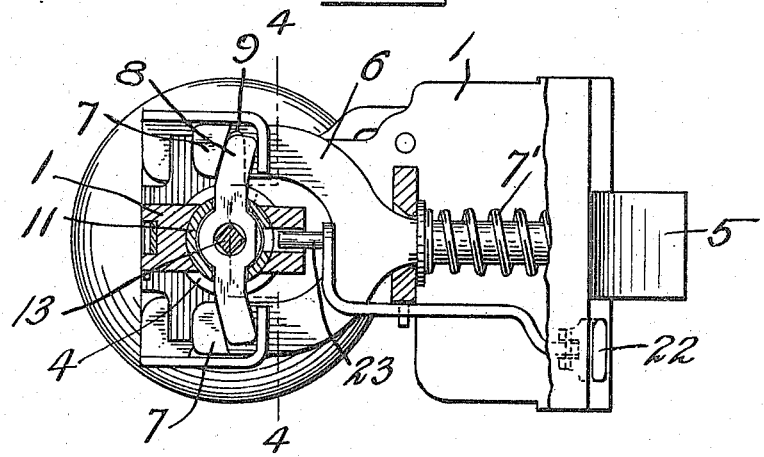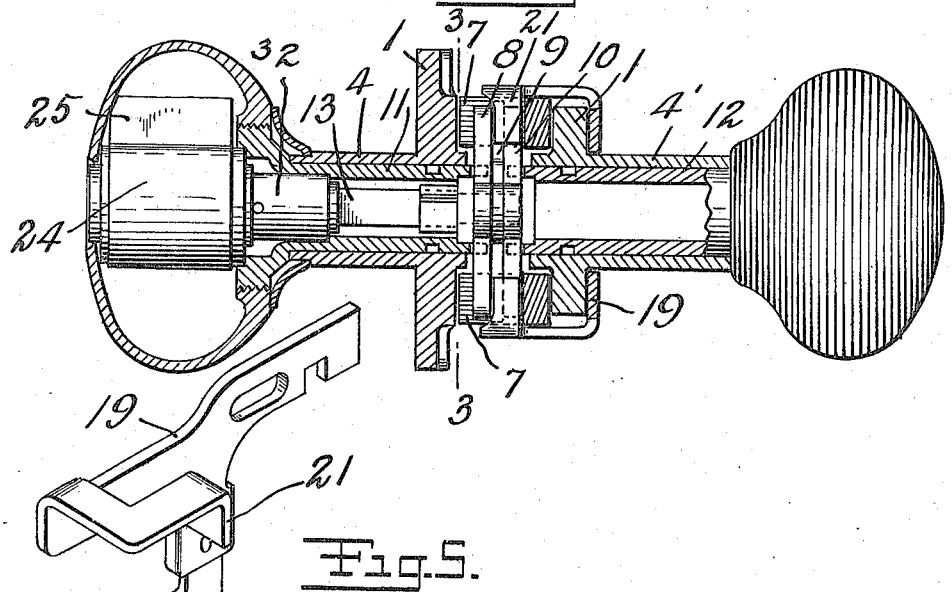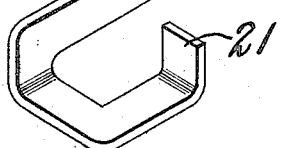

E. L. TEICH.
LOCK.
APPLICATION FILED MAY 2, 1916.
1,190,686.
Patented July 11, 1916.
4 SHEETS—SHEET 3.
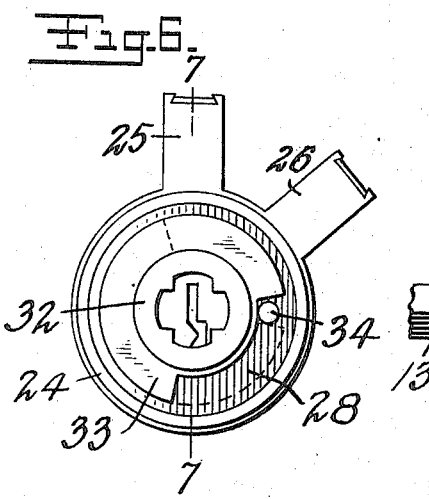
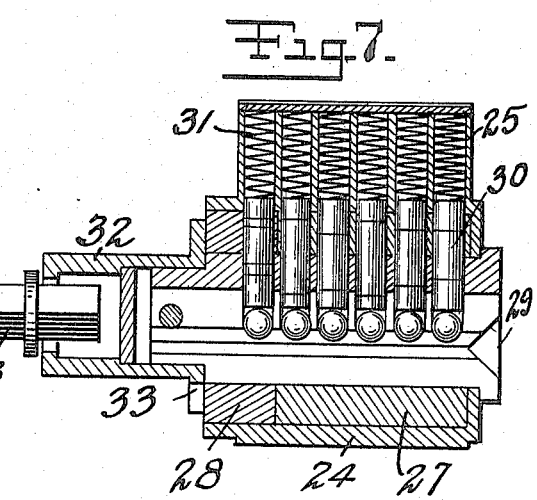
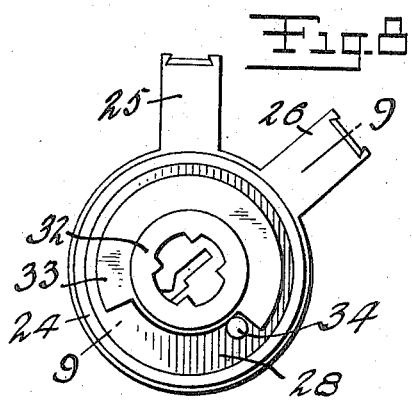
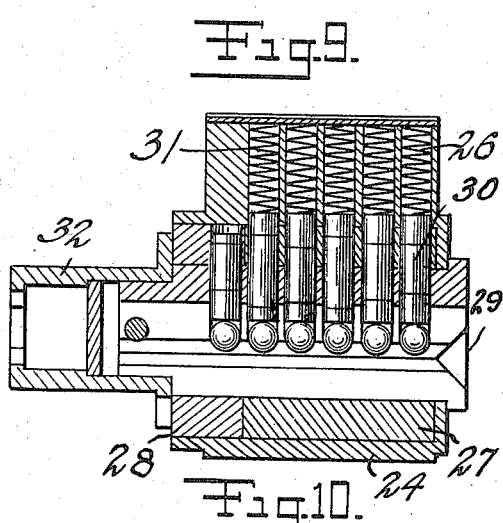
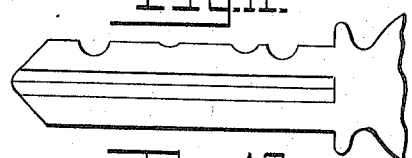
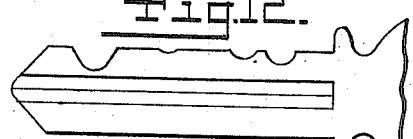
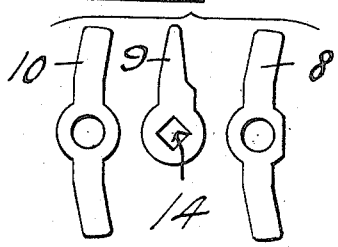
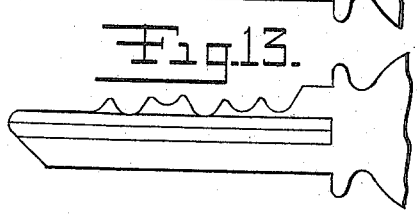
Inventor
E. L. Teich
By his Attorneys

E. L. TEICH.
LOCK.
APPLICATION FILED MAY 2, 1916.

1,190,686.

Patented July 11, 1916.
4 SHEETS—SHEET 4.

Inventor
E. L. TEICH
By his Attorneys
Bartlett & Brownell

UNITED STATES PATENT OFFICE.

ERNEST L. TEICH, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

LOCK.

1,190,686. Specification of Letters Patent. Patented July 11, 1916.

Application filed May 2, 1916. Serial No. 94,858.

*To all whom it may concern:*

Be it known that I, ERNEST L. TEICH, a citizen of the United States, residing at New Britain, county of Hartford, State of Connecticut, have invented a certain new and useful Improvement in Locks, of which the following is a full, clear, and exact description.

My invention relates to improvements in locks, and has for its object to provide a pin tumbler lock, which, under certain conditions, can be actuated by a plurality of keys, and in which one key can be used as a lock-out key against all other keys.

It further has for its object to provide a latch pin tumbler lock, in which the latch can be dogged by the operation of a thumb turn on the inside of the lock, which thumb turn can be thrown off by the means of the lock-out key just referred to, so that the lock will be released and the latch retracted by said key.

It further has for its object to provide such a lock in which the thumb turn can be thrown off and the lock unlocked by one style of guest key but in which the thumb turn cannot be thrown off by another style of guest key, although the lock can be unlocked by the second style of guest key when fully inserted if the thumb turn is not in dogging position.

From the foregoing it will be seen that if one style of guest key is supplied to a guest of a hotel, the other style of guest key being kept in the office, the lock can be opened by the emergency and also by the guest key, unless the lock-out key has been used to lock out the guest key, that is, if two of the other style of guest keys are issued, the lock can be unlocked by the emergency key and by a second guest key, even though the thumb turn has been actuated to lock the lock from the inside of the door by one guest who has the other of the two guest keys issued.

In illustrating the embodiment of my invention I have shown pin tumblers, which are adapted to be positioned by the three keys above referred to, but have not shown the divisions necessary for controlling the lock by master keys or grand master keys, such showing not being necessary to fully disclose my present invention and the adaptation of such locks for use with master and grand master keys being well understood by those skilled in the art.

The following is a description of a lock embodying my invention, reference being had to the accompanying drawings, in which—

Figure 2:
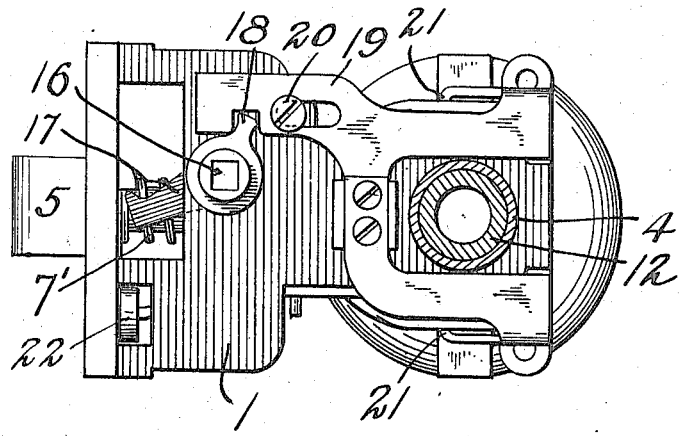
Figure 14:
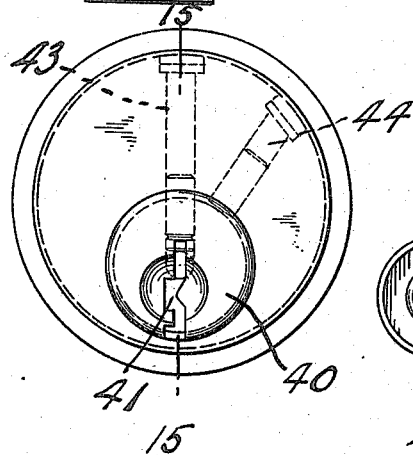
Figure 15:
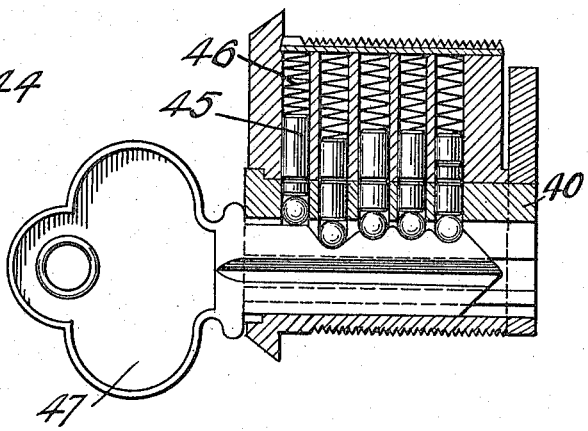
Figure 16:
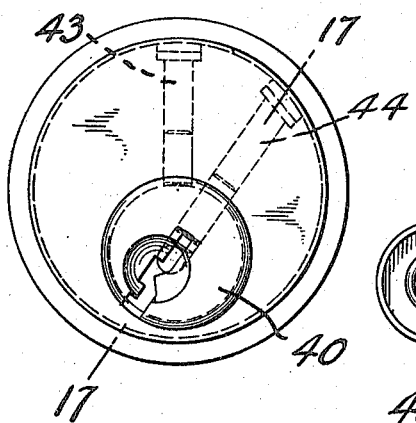
Figure 17:
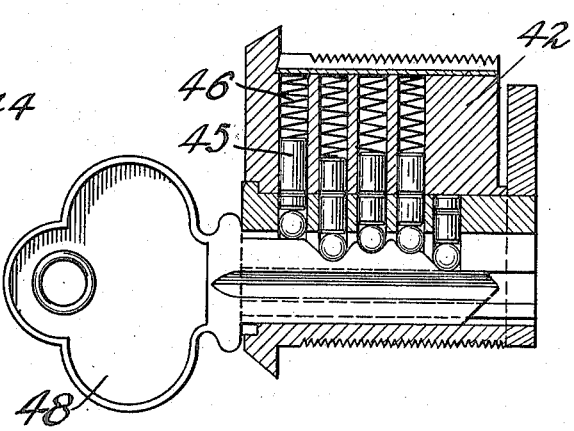

Figure 1 shows a plan view of a lock embodying my invention; Fig. 2 is a side elevation of the same, one knob spindle being shown in section and one escutcheon and the thumb turn removed; Fig. 3 shows a section on the line 3—3 on Fig. 4; Fig. 4 shows a section on the line 4—4 Fig. 3; Fig. 5 shows a perspective detail of the thumb turn retracting slide; Fig. 6 shows a view of the tumbler casing, looking toward the left hand end of Fig. 7 with the parts in normal position; Fig. 7 shows a section of the tumbler casing on the line 7—7 of Fig. 6; Fig. 8 shows an end view of the tumbler casing with the cylinder in position to lock out all keys but the emergency key; Fig. 9 shows a section on the line 9—9 Fig. 8; Fig. 10 shows in side elevation details of certain roll-backs; Figs. 11, 12 and 13 show respectively in side elevation the ordinary guest key, the duplicate guest key and the emergency key. Figs. 14 to 17 inclusive show details of a modification, which embodies some of the features of my invention. In these figures Fig. 14 is a front view of a cylinder pin tumbler lock, which can be actuated by two keys, and in which one key can be used to lock out the other key, the plug being in normal position. Fig. 15 shows a section on the line 15—15 of Fig. 14 with a guest key inserted; Fig. 16 shows the same lock with the parts in position to lock out the guest key; Fig. 17 shows a section on the line 17—17 of Fig. 16 with the lock-out key in position ready to be withdrawn so as to lock out the guest key.

Referring more particularly to the drawings, Figs. 1 to 10 inclusive show a lock of the general type shown in patent to August Arens, #1,057,795, granted April 1, 1913, some of the dogging features, however, being omitted for the sake of clearness.

In the drawings, 1 is the frame of a self contained lock, which can be mounted in a door without disassembling.

2—2' are escutcheon plates, to which are attached collars 3—3' surrounding projections 4—4' from the lock frame.

5 is a pivoted latch bolt, to which is connected a sliding frame 6, which is actuated by a spring 7' so as to normally tend to hold the latch bolt 5 in a protracted position. The sliding frame 6 is provided with two laterally projecting parts 7, with which the roll-backs 8, 9 and 10 coöperate, so that when any one of said roll-backs is revolved about its axis so as to engage a part 7, frame 6, together with the latch bolt 5, is retracted.

11 is the shank of the outside knob, which is provided with recesses in which the roll-back 8 lies, so that when the outside knob is turned the roll-back 8 is revolved so as to retract the latch bolt 5.

12 is the shank of the inside knob provided with similar notches in which the roll-back 10 lies, so that when the inside knob is turned the latch 5 is retracted in a similar manner.

13 is a rod whose outer squared end fits in a corresponding recess in a projection actuated by the tumbler mechanism and whose inner end has a squared portion fitting the hole 14 in the roll-back 9 so that when the rod 13 is turned by a key the roll-back 9 is turned. When this roll-back is turned in the proper direction, it too engages one of the projections 7 to retract the latch bolt 5.

15 is a thumb turn mounted on the inside of the door and having a squared shank entering the hole 16 in a revolving member, which carries a latch dogging device 17. When the parts are in the position shown in Fig. 2, the latch dogging device 17 lies behind the latch bolt 5, preventing its withdrawal except under conditions hereinafter mentioned. A guest, in order to lock his door from the inside, turns the thumb turn so as to bring the parts into position shown in Fig. 2, whereupon the door is locked against entry from the outside except by what I term the "duplicate guest keys" or the "emergency key." Connected to the dogging member 17 by a sleeve is a projection 18 lying upon the outside of the frame 1, which projection engages a notch in a slide 19 secured to the frame by a screw 20. This slide 19 has two inwardly turned portions 21, which lie in the paths of the roll-backs 9 and 10 shown in Fig. 4, said roll-backs lying between these projections and the projection 7 of the slide 6. On account of this arrangement, when the inner knob is turned, the roll-back 10 actuates the slide 19 to withdraw the dogging device 17 out of operative position relatively to the latch 5, and, moreover, when the roll-back 9 is turned in one direction by a key, the slide 19 is also actuated to withdraw the dogging device 17 from the latch bolt. This last mentioned motion can be brought about by the emergency key and also by the duplicate guest key, the result being that if the door is locked from the inside by the thumb turn, the thumb turn can be retracted by either the emergency key or a duplicate guest key from the outside or by the knob from the inside.

22 is the ordinary pivoted lever for actuating the locking pin 23, which constitutes the night latch and is shown in retracted position in Fig. 3. When the lever 22 is moved so as to move the pin 23 to the left, it enters a hole in the shank 11, so as to lock the outer knob against turning.

Referring to the tumbler mechanism, 24 is the tumbler mechanism casing, having at its periphery a series of tumbler chambers 25 and a second series of tumbler chambers 26, these two series of tumbler chambers being angularly displaced relatively to one another. Within the casing is a master sleeve 27 and an emergency sleeve 28 and within these sleeves is a core 29 having a key slot and openings which register with the openings in the series of tumbler chambers 25, these three members constituting in this type of lock what I term the "plug". In the chambers 25 and 26 and the openings in the plug are sections of the ordinary sectional pin tumblers 30 controlled by the springs 31. Connected to the core 29 is a projection 32, having in its end an angular opening adapted to receive the angular head of the rod 13. This projection 32 is provided with a flange 33, a segment of which is cut away, as shown in Figs. 6 and 8. In the space left at the cut away portion is located a pin 34, mounted upon the emergency sleeve 28 and acting to limit the movement of the core 29 and projection 33 relatively to the emergency sleeve 28, when the emergency sleeve 28 is held stationary, i. e., when the tumbler mechanism is actuated by any key except the emergency key and duplicate guest key. The emergency key has its bits so formed as to position breaks in the tumbler pins at the peripheries of the emergency and master sleeves. The bits on the duplicate guest key are so formed as to position the break in the emergency sleeve at the periphery thereof and the breaks in the other pins at the periphery of the core. The bits on all other keys are so formed as to position a break in the last pin at the periphery of the core, i. e., between the core and the emergency sleeve and breaks in the other pins at proper places.

When the parts are in the position shown in Fig. 7, if the duplicate guest key is inserted, parts can be moved by a counter clockwise movement of that key to retract the dogging device and then by a clockwise movement to withdraw the latch. With the parts as shown in Fig. 7, the ordinary guest key, since it positions the breaks at the periphery of the core, cannot be moved in the reverse direction to undog the latch, since the emergency sleeve is fixed and the pin 34 thereon being in engagement with one extremity of the cut-away section of the flange 33 prevents the projection 32, which is connected to the flange 33, from being moved in the reverse direction to undog the latch.

If the thumb turn 15 is turned from the inside of the door, so that the dogging device 17 dogs the latch 5, the door is locked against the outside knob even if the night latch is off. If the night latch is on, and the thumb turn is turned so as to dog the latch, the lock is dogged against operation by the outside knob by the two means just referred to. With the lock in this condition it can be only opened by the emergency key or a duplicate guest key. This results from the fact that when the ordinary guest key shown in Fig. 11 is inserted in the lock, it causes the tumblers to break at the periphery of the core of the plug, in which position the core can be revolved only in the direction which would retract the bolt 5 if the same were not dogged. If, however, the duplicate guest key is inserted, the tumbler on the left, Fig. 7, is positioned so as to break at the periphery of the emergency sleeve, while the other tumblers are positioned so as to break at the periphery of the core. This enables the key to be turned a slight distance in the direction opposite to the unlatching direction, revolving the roll-back 9 so that it engages one of the projections 21 and throws the dogging device 17 out of operative position relatively to the latch 5. After this operation this key can be turned in the opposite direction so as to withdraw the bolt 5 in the ordinary manner. If the emergency key is inserted it positions the tumbler sections so that they break at the periphery of the sleeves of the plug so that the plug as a whole can be turned so as to retract the dogging device 17 and then to withdraw the latch 5. While the duplicate guest key and also the emergency key can be inserted when the plug is in the position shown in Fig. 7, the duplicate guest key when the plug is in the position shown in Figs. 8 and 9 cannot be fully inserted, or if in place cannot be withdrawn, since under those conditions the tumbler at the left hand is opposite a solid wall of the cylinder casing so that it will not lift so as to permit passage of the last rise upon the duplicate guest key. The emergency key, however, because it does not have this last rise, can be inserted when the plug is in the position shown in Fig. 9 and can also be withdrawn when it is in that position. The duplicate guest key, although it can be used to move the plug into the position shown in Figs. 8 and 9 for the purpose of turning the thumb turn and retracting its dog, cannot be withdrawn when the plug is in the position shown in Figs. 8 and 9. The emergency key, however, moves the tumblers into position so that the breaks occur at the periphery of the emergency and master sleeves and so can be inserted with the parts in the position shown in Fig. 9, so that the plug can be turned into or out of the lockout position and can be withdrawn with the parts in either position. When the emergency key is withdrawn with the parts in the position shown in Figs. 8 and 9, the other keys are locked out and the position of the key slot shows that all keys but the emergency key are locked out.

Figs. 14 to 17 inclusive show an ordinary cylinder pin tumbler lock, in which the lockout feature of my invention is embodied, with the result that one key, which may be termed an emergency and lock-out key, can be used to lock out another key. In this construction the plug consists of a single member corresponding to the core of the other lock and is surrounded by a casing having two angularly disposed series of chambers with sectional pin tumblers therein. 40 is the plug having the ordinary key slot 41. 42 is the casing having two series of chambers 43—44, which, together with the cavities in the plug, contain the sections 45 and springs 46 of the pin tumblers. The series 43 has a greater number of chambers than the series 44, with the result that when the plug is in the position shown in Fig. 15, either of the keys 47 or 48 may be inserted to operate the lock. If, however, the key 48 is inserted, and the plug is then turned to the position shown in Figs. 16 and 17, and the key 48 thereafter withdrawn, the key 47 cannot be inserted, because the last rise thereon will engage the pin tumbler to the right, which pin tumbler cannot be lifted because it is opposed by a solid portion of the casing. The key 47 is, therefore, locked out, and cannot be used until the plug is restored to the position shown in Fig. 14 by the use of the key 48.

As will be evident to those skilled in the art my invention permits of various modifications without departing from the spirit thereof or the scope of the appended claims.

What I claim is:

1. In a pin tumbler lock, the combination of a casing having two series of tumbler chambers disposed at an angle to one another, a plug having cavities therein corresponding to the chambers in said series, and two keys adapted to position said tumblers so that said plug when in normal position can be turned, one of said keys being insertible and withdrawable when said cavities are in line with either of said series, the other key being insertible and withdrawable when said cavities are in line with one of said series, and means for preventing said other key from being inserted or withdrawn when the cavities are in line with the other of said series, the position of the key-slot indicating whether said second key can be inserted.

2. In a pin tumbler lock, the combination of a casing having two series of tumbler chambers, one series having more chambers than the other, a plug having tumbler cavities in excess of the chambers in the smaller series and tumbler sections in said chambers and cavities.

3. In a pin tumbler lock, the combination of a casing having two series of tumbler chambers, one series having more chambers than the other, a plug having tumbler cavities in excess of the chambers in the smaller series, tumbler sections in said chambers and cavities, and two keys, both of which will position the tumblers so as to permit the operation of the inserted key when in line with the larger series, and one of which has a rise engaged by a section in the innermost cavity when the key is in alinement with said smaller series.

4. In a pin tumbler lock, the combination of a casing having two series of tumbler chambers, one series having more chambers than the other, a plug having tumbler cavities in excess of the chambers in the smaller series, tumbler sections in said chambers and cavities, said plug consisting of an inner core member and an outer sleeve member, said tumbler sections being such that they can be positioned to break at the surface of the periphery of either of said members.

5. In a pin tumbler lock, the combination of a casing having two series of tumbler chambers, one series having more chambers than the other, a plug having tumbler cavities in excess of the chambers in the smaller series, tumbler sections in said chambers and cavities, said plug consisting of an inner core member and an outer sleeve member, said tumbler sections being such that they can be positioned to break at the surface of the periphery of either of said members, said outer sleeve being divided transversely to its axis, each part thereof having a portion of the tumbler cavities therein.

6. In a pin tumbler lock, the combination of a casing having two series of tumbler chambers, one series having more chambers than the other, a plug having tumbler cavities in excess of the tumbler chambers in the smaller series, tumbler sections in said chambers and cavities, a spring protracted latch, a thumb turn for dogging said latch, and means for retracting said thumb turn when said plug is moved so as to bring its cavities toward alinement with said smaller series.

7. In a pin tumbler lock, the combination of a casing having two series of tumbler chambers, one series having more chambers than the other, a plug having tumbler cavities in excess of the tumbler chambers in the maller series, tumbler sections in said chambers and cavities, a spring protracted latch, a thumb turn for dogging said latch, means for retracting said thumb turn when said plug is moved toward alinement with said smaller series, an outer knob, a rollback actuated by said knob for retracting said latch, and means for deadlocking said knob and roll-back.

8. In a pin tumbler lock, the combination of a casing having two angularly disposed series of chambers, one series having a greater number of chambers than the other, a core, two sleeves surrounding said core, said core and sleeves having cavities for tumbler sections in excess of the chambers in the smaller series, said tumbler sections being adapted to be positioned so as to break at the periphery of said core or partly at the periphery of said core and partly at the periphery of one of said sleeves as desired.

ERNEST L. TEICH.

Copies of this patent may be obtained for five cents each, by addressing the "Commissioner of Patents, Washington, D. C."